United States Patent
Morais Bicudo et al.

(10) Patent No.: US 11,218,625 B2
(45) Date of Patent: Jan. 4, 2022

(54) CAMERA SYSTEM

(71) Applicant: MOTOROLA SOLUTIONS, INC., Chicago, IL (US)

(72) Inventors: Felippe Morais Bicudo, Fort Lauderdale, FL (US); Ryan M. Nilsen, Plantation, FL (US); Chi T. Tran, Naperville, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/878,328

(22) Filed: May 19, 2020

(65) Prior Publication Data
US 2021/0368074 A1 Nov. 25, 2021

(51) Int. Cl.
*H04N 5/225* (2006.01)
*B60R 11/04* (2006.01)
*B60R 11/00* (2006.01)

(52) U.S. Cl.
CPC ........... *H04N 5/2254* (2013.01); *B60R 11/04* (2013.01); *H04N 5/2252* (2013.01); *H04N 5/2253* (2013.01); *B60R 2011/0026* (2013.01)

(58) Field of Classification Search
CPC .. H04N 5/2254; H04N 5/2253; H04N 5/2252; B60R 11/04; B60R 2011/0026
See application file for complete search history.

(56) References Cited

U.S. PATENT DOCUMENTS

| | | | | |
|---|---|---|---|---|
| 6,115,060 | A * | 9/2000 | Rowley | B63C 11/49 348/148 |
| 7,719,610 | B2 * | 5/2010 | Kung | H04N 5/23238 348/373 |
| 8,201,800 | B2 | 6/2012 | Filipiak | |
| 8,692,659 | B2 | 4/2014 | Schofield et al. | |
| 9,817,298 | B1 * | 11/2017 | Dhall | G03B 17/02 |
| 10,038,829 | B2 * | 7/2018 | Gilbert | F16M 11/2078 |
| 10,345,682 | B1 * | 7/2019 | Jamison, Jr. | F16B 2/10 |
| 10,397,452 | B2 * | 8/2019 | Kazama | G01D 11/245 |
| 10,518,717 | B2 * | 12/2019 | Zurowski | B60R 11/04 |
| 2015/0156380 | A1 * | 6/2015 | Volfson | H04N 5/2252 348/373 |
| 2018/0367713 | A1 * | 12/2018 | Gilbert | F16M 11/14 |

FOREIGN PATENT DOCUMENTS

| | | | |
|---|---|---|---|
| DE | 102 37 554 A1 | 3/2004 | |
| DE | 10237554 A1 * | 3/2004 | ............. B60R 11/04 |
| GB | 2531355 A * | 4/2016 | ......... G08B 13/1963 |
| WO | WO-2008091034 A1 * | 7/2008 | ......... H04N 5/23299 |

* cited by examiner

*Primary Examiner* — Richard A Hansell, Jr.
(74) *Attorney, Agent, or Firm* — Michael Best & Friedrich LLP

(57) ABSTRACT

A camera system includes a camera housing having a ball-shaped structure and a camera lens disposed within the ball-shaped structure. The camera system also includes a mount including a receptacle to hold the camera housing and at least one element configured to selectively engage and disengage the camera housing to fix a rotational position of the camera housing relative to the mount. The camera housing is configured to rotate relative to the mount.

24 Claims, 8 Drawing Sheets

CAMERA SYSTEM

BACKGROUND OF THE INVENTION

Camera systems are often mounted to windshields on motor vehicles. These systems commonly include a mounting structure that is fixed to the windshield. A camera in a camera system generally includes a housing. The housing generally includes a camera lens. The housing is rotatably coupled to the mounting structure at a pivot point that is spaced away from the camera housing and the camera lens. The camera housing and the camera lens rotate together about the pivot point. Such systems may not provide for optimal focusing on visual targets.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
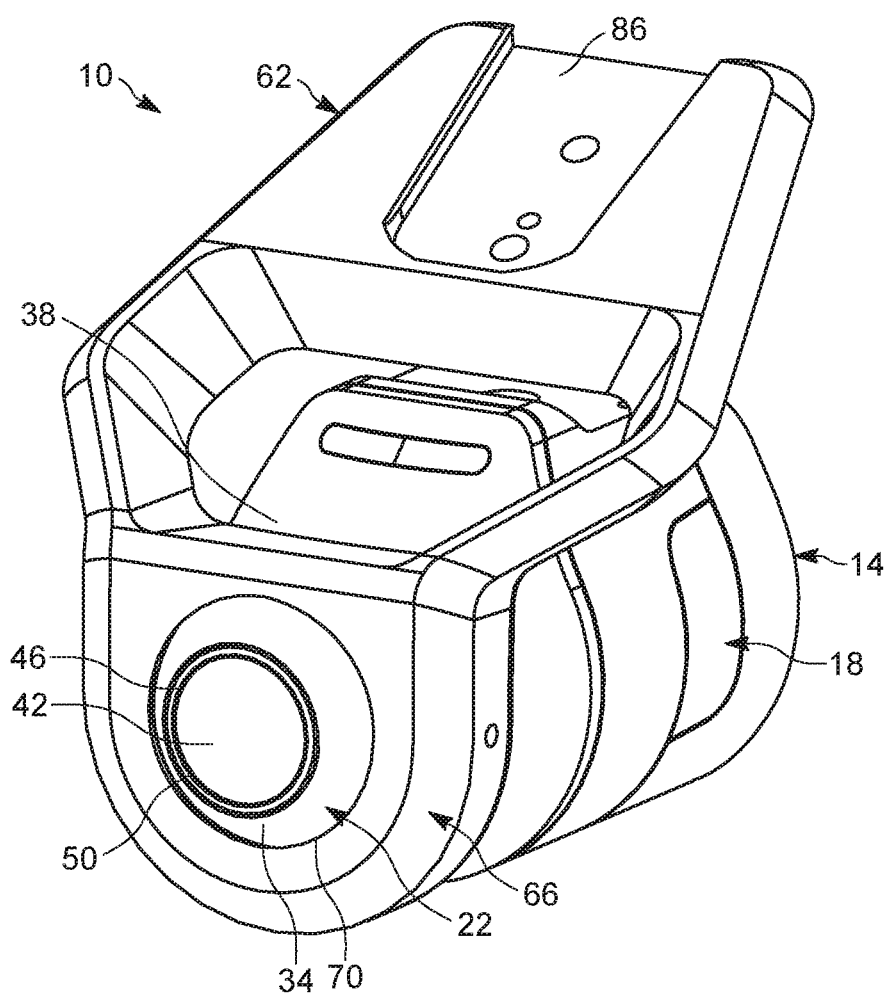
FIG. 1 is a perspective view of a camera system in accordance with one embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted above, in many vehicle-mounted camera systems, the camera housing and the camera lens rotate together about the pivot point. However, with this arrangement any adjustment or rotation of the camera housing about the pivot point results in the camera lens being moved closer to, or farther away from, the intended visual target. In the case of a windshield-mounted camera system, the target may be the windshield. In many instances, it is desirable for the camera lens to always remain at substantially a constant distance to the visual target to maintain a desired focus or focal distances. Accordingly, there is a need for a camera system that provides, among other things, a mechanism for maintaining the camera lens at a constant or substantially constant distance to a visual target.

Briefly, there is provided herein an improved camera system. A camera system, according to one embodiment, includes a camera housing having a ball-shaped structure and a camera lens disposed within the ball-shaped structure. The camera system also includes a mount including a receptacle to hold the camera housing and at least one element configured to selectively engage and disengage the camera housing to fix a rotational position of the camera housing relative to the mount. The camera housing is configured to rotate relative to the mount.

Another embodiment provides a camera system having a camera housing with an elongate first housing portion that extends along a longitudinal axis, and a second housing portion rigidly extending from the first housing portion along the longitudinal axis. The second housing portion has a ball-shaped structure. The camera system also includes a camera lens disposed within the second housing portion. The camera lens is positioned axially along the longitudinal axis at a distal end of the camera housing, such that the camera lens faces away from the first housing portion.

FIGS. 1-5 illustrate a camera system 10. In the illustrated embodiment the camera system 10 is designed to be used with a motor vehicle and to be mounted to an interior surface of a windshield of the motor vehicle to record activity taking place outside of the motor vehicle. In other embodiments, the camera system 10 may be mounted to structures other than a windshield (for example to a wall of a building), to record activity taking place near the camera system 10.

The camera system 10 includes a camera housing 14. As illustrated FIGS. 1 and 2, the camera housing 14 includes a first housing portion 18 and a second housing portion 22 extending from the first housing portion 18. The first housing portion 18 has an elongate, cylindrical shape, although other embodiments include shapes and sizes other than that illustrated. The first housing portion 18 includes a hollow interior and is sized and shaped to house one or more electrical components 26 (for example a printed circuit board, image sensor, memory, controller, and the like) within the hollow interior. As illustrated in FIG. 2, a wiring cable 30 extends into the first housing portion 18. The wiring cable 30 is coupled to one or more of the electrical components 26 and extends from the first housing portion 18 to other components, for example, a source of electrical power (not shown) and/or a video processing and display device.

Figure 2:
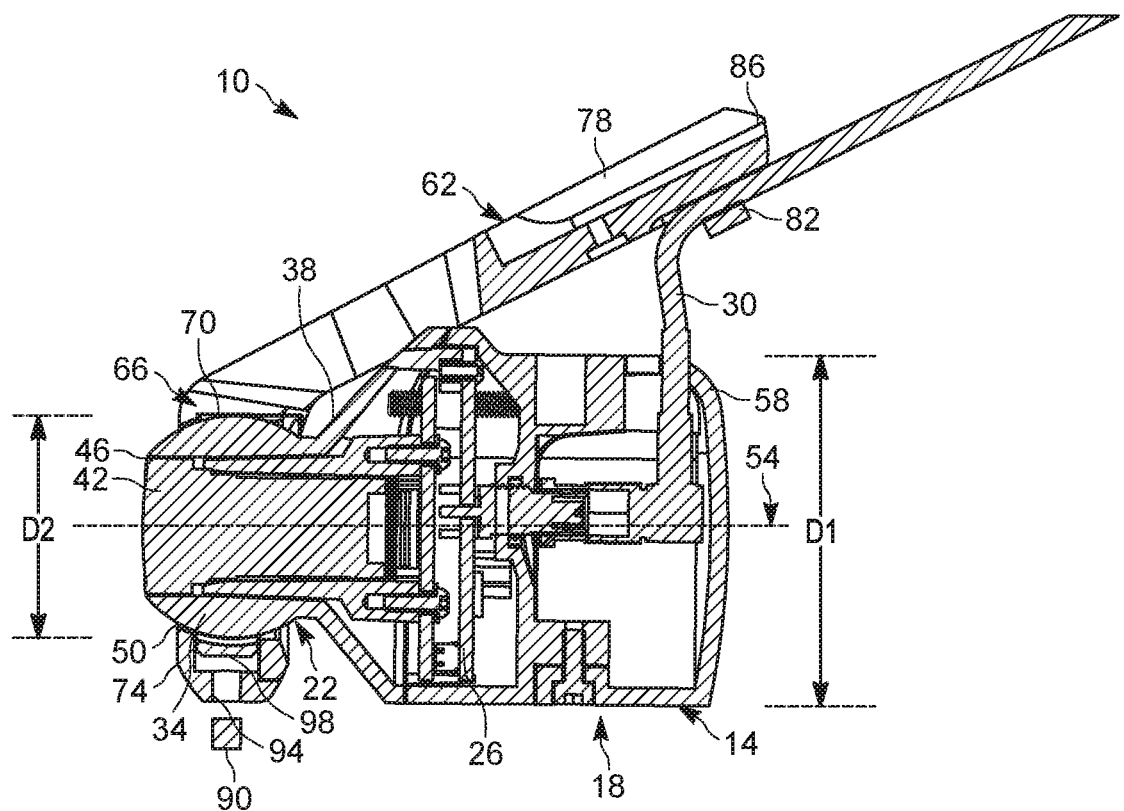
FIG. 2 is a cross-sectional view of the camera system of FIG. 1

With continued reference to FIGS. 1 and 2, the second housing portion 22 has a ball-shaped structure 34 coupled a front surface 38 of the first housing portion 18. In the illustrated embodiment the ball-shaped structure 34 is a partial spherical structure that is rigidly coupled to the first housing portion 18. In other embodiments, the ball-shaped structure 34 may have a shape other than that illustrated (for example a shape that is more completely spherical, or has more of an elongated spheroid shape or flattened spheroid shape as compared to what is illustrated in FIGS. 1 and 2).

As illustrated in FIG. 2, the first housing portion 18 has a first diameter D1 along a majority of a length of the first housing portion 18, and the ball-shaped structure 34 has a second diameter D2 that is less than the first diameter. The ball-shaped structure 34 and the first housing portion 18 are integrally formed together as a single, rigid piece (for example comprised of plastic or other suitable material). In other embodiments, the ball-shaped structure 34 may be a separate component that is fixed to the first housing portion 18 (for example with fasteners or adhesives). Additionally, in other embodiments a stem may be provided between the ball-shaped structure 34 and the first housing portion 18, such that the ball-shaped structure 34 is spaced slightly from the first housing portion 18.

With reference to FIGS. 1-5, the camera system 10 additionally includes a camera lens 42 that is disposed within the ball-shaped structure 34. In the illustrated embodiment the ball-shaped structure 34 includes an aperture 46 at a distal end 50 of the camera housing 14. As illustrated in FIG. 2, the camera lens 42 is positioned at least partially within the aperture 46, such that the camera lens 42 faces away from the first housing portion 18 and along a longitudinal axis 54. The longitudinal axis 54 extends through the camera lens 42, through the ball-shaped structure 34, and entirely through the first housing portion 18 from the distal end 50 of the camera housing 14 to a proximal end 58 of the camera housing 14. In some embodiments, the camera lens 42 is positioned differently, for example, so that the camera lens 42 faces along an axis that does not pass through (or only passes through a portion of) the first housing portion 18.

With reference to FIGS. 1-5, the camera system 10 additionally includes a mount 62 that holds the camera housing 14 and couples the camera housing 14 to another structure (for example a windshield). As illustrated in FIGS. 1 and 2, the mount 62 has a receptacle 66 to hold the camera housing 14. The receptacle 66 has an aperture 70. The ball-shaped structure 34 extends at least partially through the aperture 70. In the illustrated embodiment, the ball-shaped structure 34 is disposed at least partially within the aperture 70 and rotates within the aperture 70 to adjust an orientation of the longitudinal axis 54 and the camera housing 14. Consequently, the camera housing 14 overall rotates relative to the mount 62 via the rotation of the ball-shaped structure 34 within the aperture 70.

With continued reference to FIG. 2, the mount 62 includes a first region 74 defining the receptacle 66 and the aperture 70, and a second region 78 extending away from the first region 74 at an oblique angle (for example greater than 90 degrees). The second region 78 is sized and shaped to be coupled (for example fixed) to an interior surface of a windshield of a motor vehicle. As illustrated in FIG. 2, the second region 78 includes a cable guide 82 along a lower surface of the second region 78, and one or more connecting features 86 (for example recesses and/or protrusions) along a top surface of the second region 78 for connecting the second region 78 to a windshield. The cable guide 82 is a hook, detent, or other structure that is used to secure a wiring cable. As described above, the camera system 10 includes a wiring cable 30 extending away from the camera housing 14. The wiring cable 30 is secured (for example releasably secured) to the cable guide 82.

Figure 3:
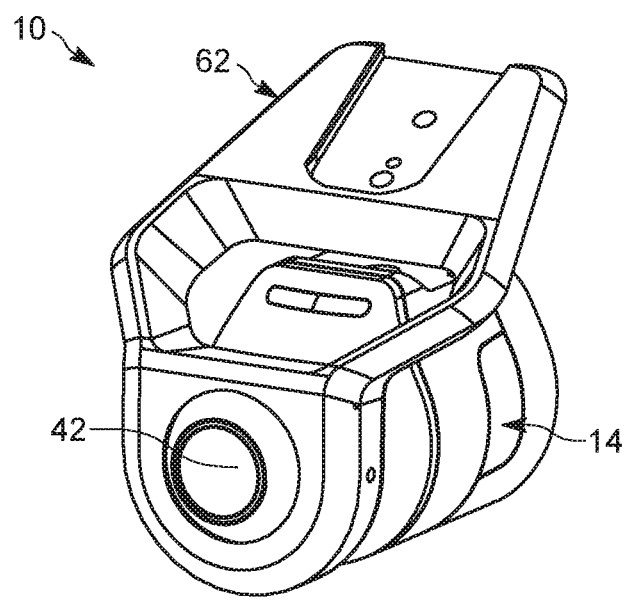
FIGS. 3-5 are perspective views of the camera system of FIG. 1, illustrating examples of different rotational positions of a camera housing and camera lens of the camera system.
Figure 4:
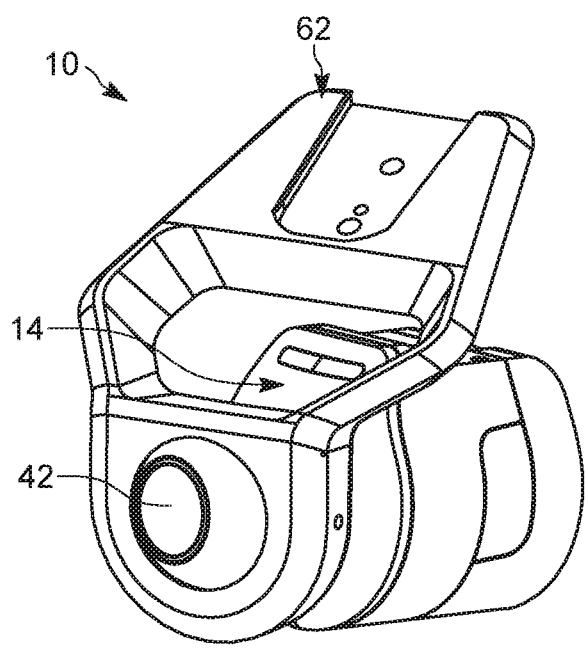
Figure 5:
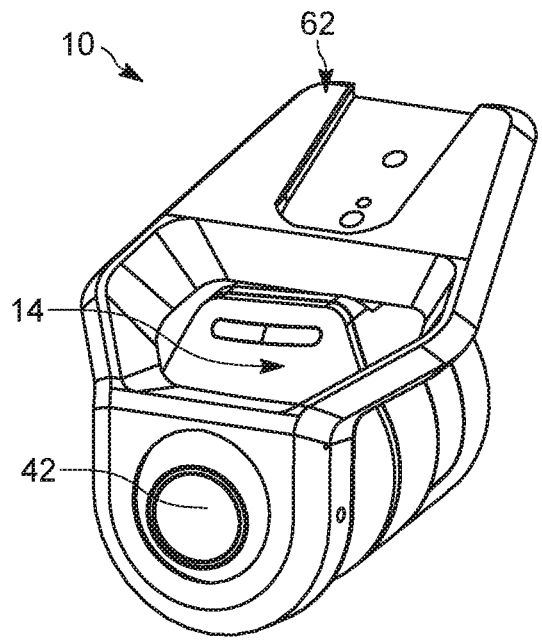

With reference to FIG. 2, the mount 62 also includes at least one element that selectively engages and disengages the camera housing 14 (for example the ball-shaped structure 34 of the camera housing 14) to fix the rotational position of the camera housing 14 relative to the mount 62. In the illustrated embodiment, this element is a set screw 90 that passes through an aperture 94 in the first region 74 of the mount 62. The set screw 90 is rotated or otherwise moved inwardly toward the ball-shaped structure 34 until the set screw 90 contacts a pad 98 or other structure sitting directly adjacent the ball-shaped structure 34. When the set screw 90 is tightened, the pad 98 is pressed tightly against the ball-shaped structure 34 and locks a rotational position of the ball-shaped structure 34 and the camera lens 42. In other embodiments the set screw 90 itself physically contacts the ball-shaped structure 34. FIGS. 3-5 illustrated examples of three different rotational positions of the camera housing 14 and its camera lens 42 via use of the set screw 90. However, various other rotational positions are possible due to the spherical shape of the ball-shaped structure. When it is desired to change the rotational position, the set screw 90 is loosened, the camera housing 14 and its camera lens 42 are rotated (for example by hand), and the set screw 90 is then tightened again. The set screw 90 is also a mechanism that may be used to maintain the camera lens 42 at a substantially constant or constant distance to a visual target such as a windshield. For example, and with continued reference to FIGS. 2-5, the camera lens 42 generally remains at a constant axial position along the longitudinal axis 54 regardless of how the camera housing 14 is rotated. This allows the camera lens 42 to maintain a desired focus or focal distance to the windshield or other target.

Figure 6:
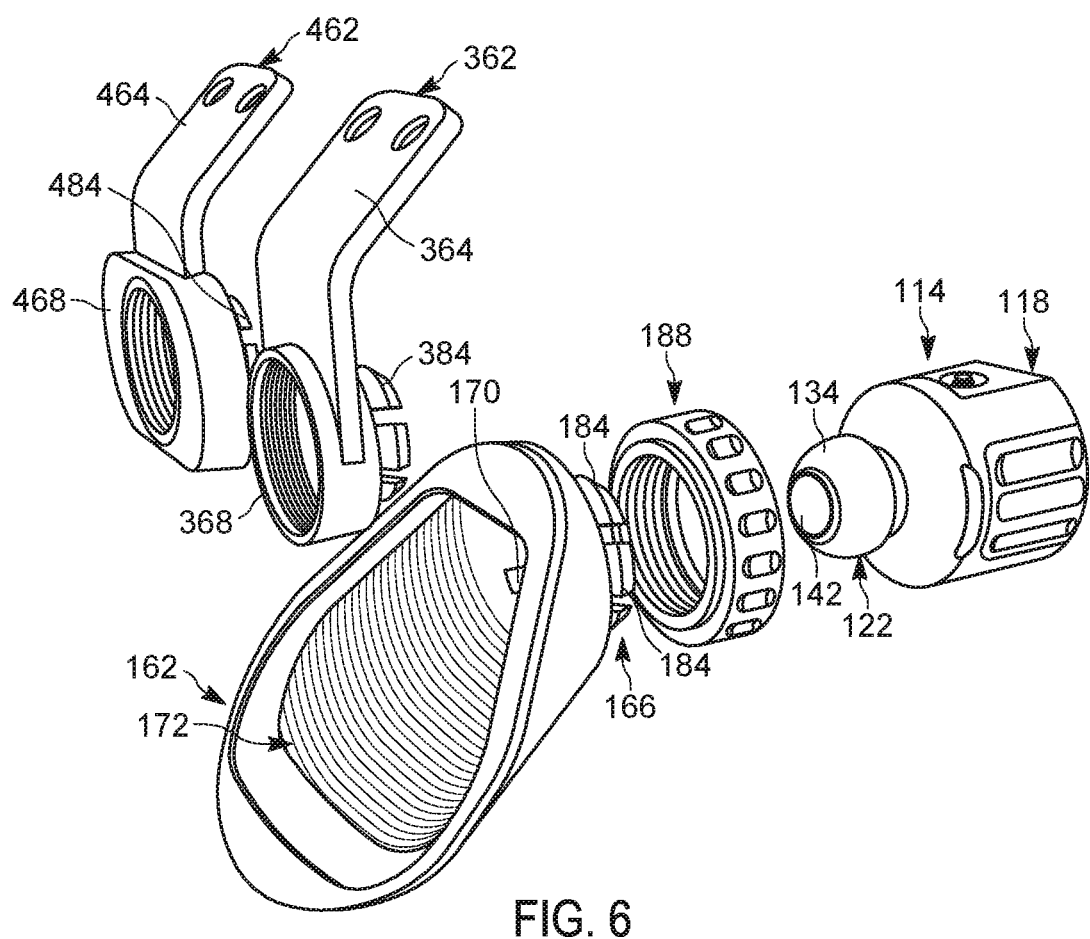
FIG. 6 is a perspective view of components that are used in camera systems in accordance with other embodiments.
Figure 7:
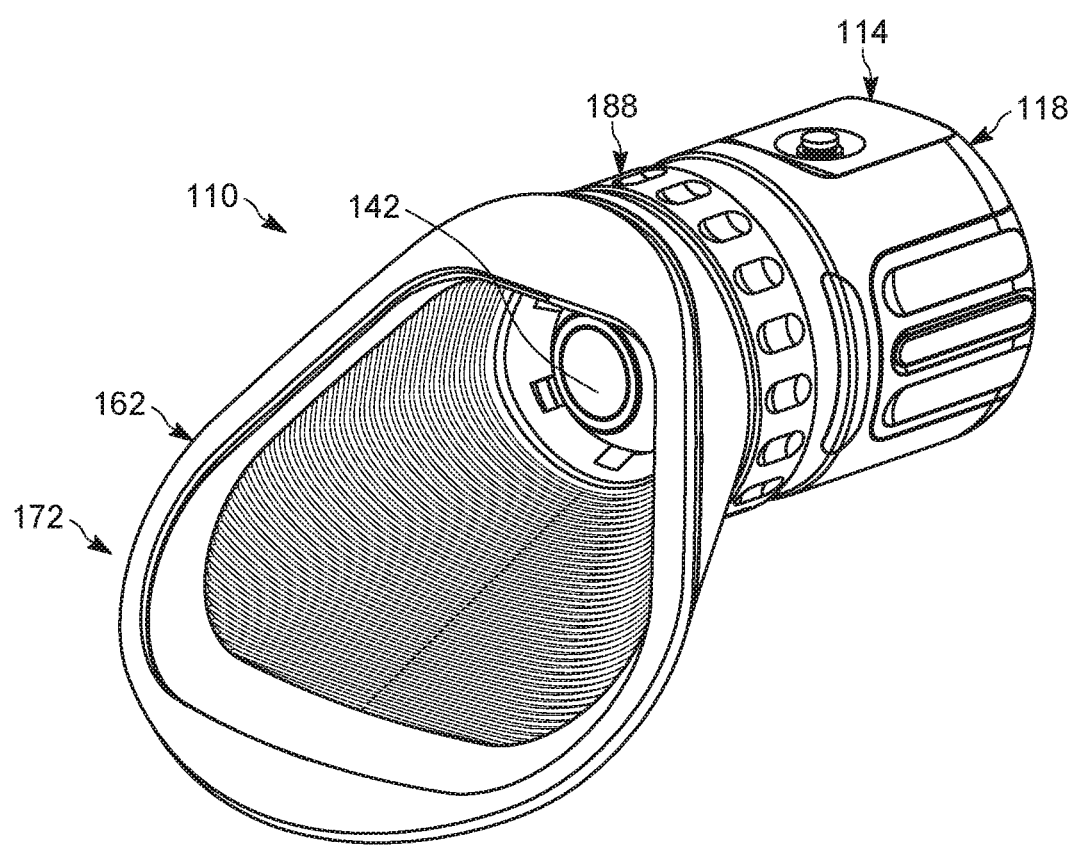
FIG. 7 is a perspective view of a camera system formed by components from FIG. 6.
Figure 8:
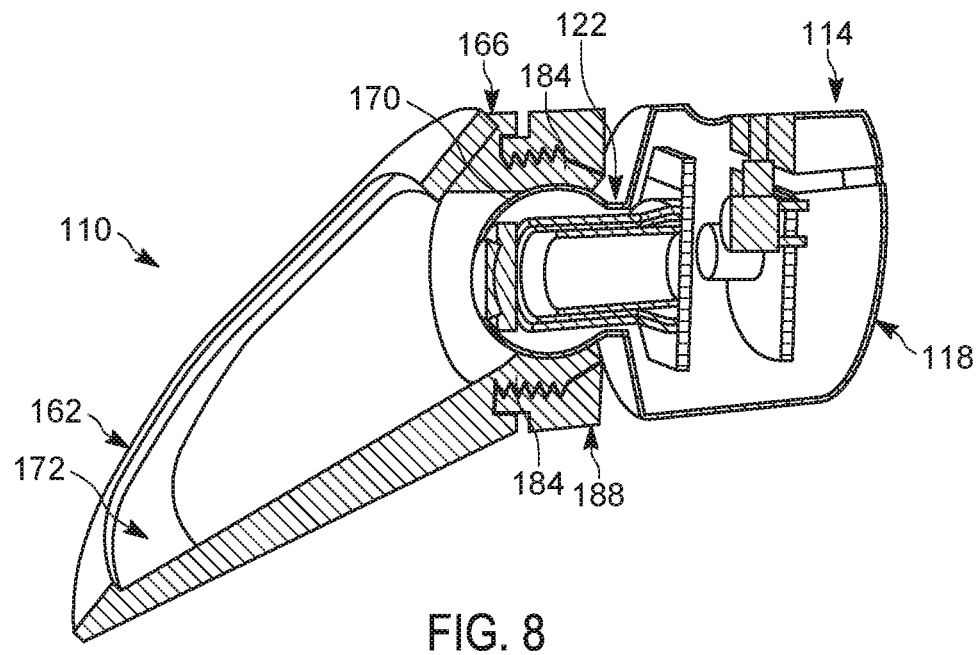
FIG. 8 is a cross-sectional view of the camera system of FIG. 7.

FIGS. 6-8 illustrate a camera system 110. Like the camera system 10, the camera system 110 is designed to be used with a motor vehicle and to be mounted to an interior surface of a windshield of the motor vehicle to record activity taking place outside of the motor vehicle. In other embodiments, the camera system 110 may be mounted to structures other than a windshield (for example to a wall of a building), to record activity taking place near the camera system 110.

The camera system 110 includes a camera housing 114. The camera housing 114 may be similar or identical to the camera housing 14. In the illustrated embodiment the camera housing 114 includes a first housing portion 118 (for example cylindrical in shape) and a second housing portion 122 extending from the first housing portion 118. The second housing portion 122 includes a ball-shaped structure 134. A camera lens 142 is disposed in the ball-shaped structure 134. Like the camera lens 42 described above, this allows the camera lens 142 to remain at a constant, or substantially constant position relative to a windshield regardless of how the camera housing 114 is rotated.

The camera system 110 also includes a mount 162. Like the mount 62, the mount 162 includes a receptacle 166 to hold the camera housing 114. The receptacle 166 has an aperture 170. The ball-shaped structure 134 extends at least partially through the aperture 170. In the illustrated embodiment, the ball-shaped structure 134 is disposed at least partially within the aperture 170 and rotates within the aperture 170 to adjust an orientation of the camera housing 114. The camera housing 114 therefore rotates relative to the mount 162 via the rotation of the ball-shaped structure 134 within the aperture 170.

Figure 9:
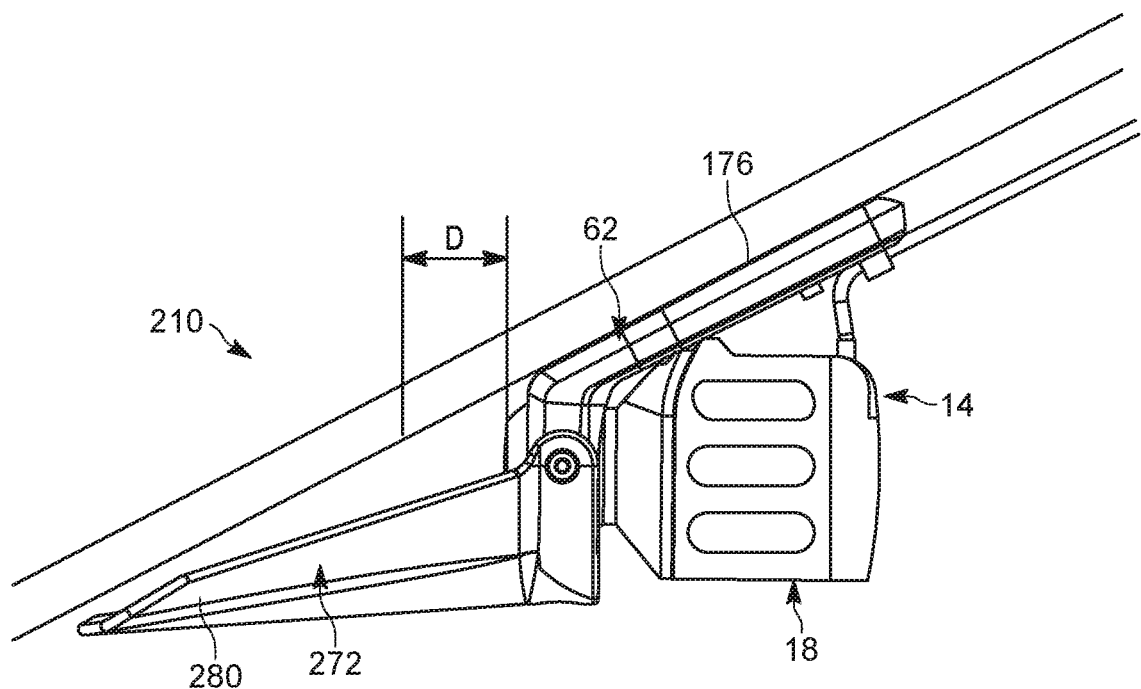
FIG. 9 is a side view of a camera system that includes components from the camera system of FIG. 1, as well as an anti-reflection shroud.

In contrast to the camera system 10, the camera housing 114 of the camera system 110 has an anti-reflection shroud 172 that forms at least part of the mount 162, extends around at least a portion of the ball-shaped structure 134, and at least partially defines the receptacle 166 and the aperture 170. The anti-reflection shroud 172 may be positioned adjacent a windshield (for example a windshield 176 as seen in FIG. 9). The anti-reflection shroud 172 additionally includes flexible tabs 184 extending rearwardly that define at least a portion of the receptacle 166.

With continued reference to FIGS. 6-8, the camera system 110 also includes at least one element to selectively engage and disengage the camera housing 114 to lock the rotational position of the camera housing 114. In the illustrated embodiment, that element is an adjustable locking ring 188. During use, the locking ring 188 is rotated to cause the flexible tabs 184 to radially compress inwardly and deflect to engage and disengage the ball-shaped structure 134 and lock a rotational position of the camera housing 114 (similar to the function of the set screw 90 described above). When the locking ring 188 is rotated in an opposite direction, the tabs 184 naturally flex radially outwardly, allowing the camera housing 114 (and it associated camera lens 142) to be rotated into positions, for example, those shown in FIGS. 3-5. In some embodiments, the locking ring 188 includes internal threading that engages external threading (seen in FIG. 8) on the tabs 184. Like the set screw 90, the locking ring 188 (in combination for example with the flexible tabs 184) is also a mechanism that may be used to maintain the camera lens 142 at a substantially constant or constant distance to a visual target such as a windshield, to maintain a desired focus or focal distance to the windshield or other target.

FIG. 9 illustrates a camera system 210. Like the camera systems 10 and 110, the camera system 210 is designed to be used with a motor vehicle and to be mounted to an interior surface of a windshield of the motor vehicle to record activity taking place outside of the motor vehicle. In other embodiments, the camera system 210 may be mounted to structures other than a windshield (for example to a wall of a building), to record activity taking place near the camera system 210.

The camera system 210 includes the camera system 10 described above (including the camera housing 14, the mount 62, and the set screw 90 for adjustment). The camera system 210 additionally includes an anti-reflection shroud 272. Like the anti-reflection shroud 172 described above, the anti-reflection shroud 272 also extends forward and inhibits reflections. As illustrated in FIG. 9, the anti-reflection shroud 272 is coupled (for example pivotally) to the mount 62. Throughout use and adjustment of the camera housing 14, a front 280 of the anti-reflection shroud 272 remains aligned with the windshield 176.

With reference to FIG. 9, when the camera housing 14 is rotated to different positions, the camera lens 42 remains at a constant distance "D", or substantially at a constant distance "D," from the windshield 176 regardless of the rotational position of the camera housing 14. This is due to the camera lens 42 being located in the ball-shaped structure 34 itself.

Figure 10:
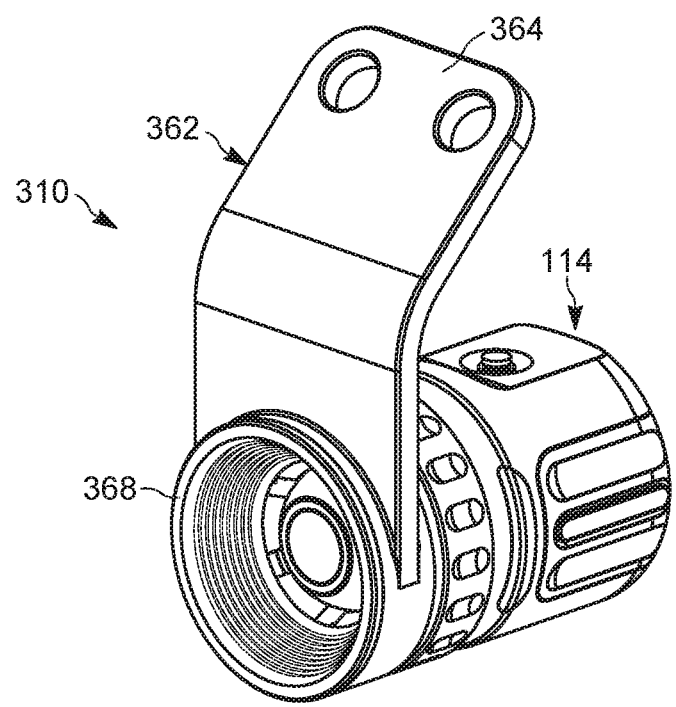
FIGS. 10 and 11 are perspective views of other camera systems formed by components from FIG. 6.
Figure 11:
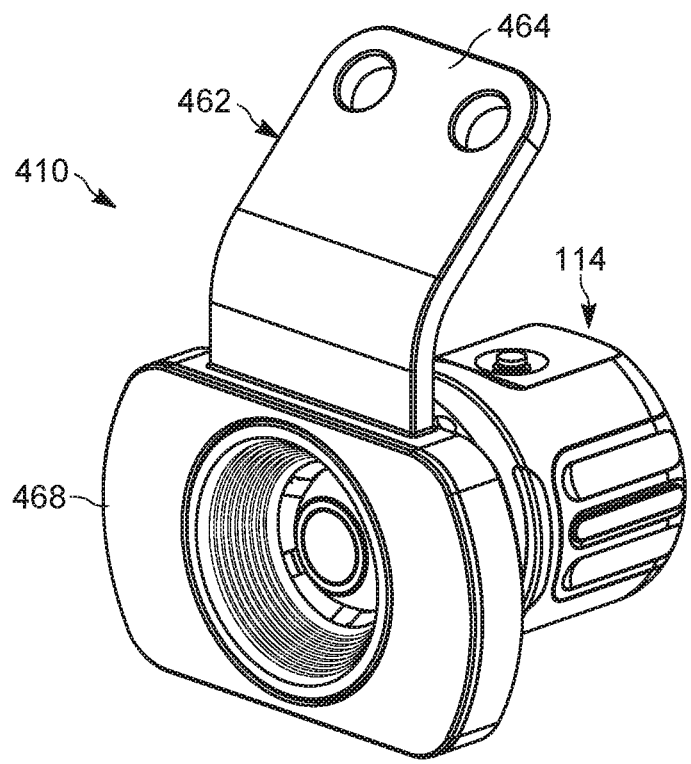

FIGS. 6, 10, and 11 illustrate additional camera systems 310 and 410. Similar to the camera systems 10, 110, and 210, the camera systems 310 and 410 are designed to be used with a motor vehicle and to be mounted to an interior surface of a windshield of the motor vehicle to record activity taking place outside of the motor vehicle. In other embodiments, the camera systems 310 and 410 may be mounted to structures other than a windshield (for example to a wall of a building), to record activity taking place near the camera systems 310 or 410.

The camera systems 310 and 410 are identical to the camera system 110 described above, with the exception of the anti-reflection shroud 172 being replaced by angled mounts 362 and 462, respectively. FIG. 6, for example, illustrates each of the angled mounts 362, 462, as well as the anti-reflection shroud 172, to demonstrate the fact that one may be replaced by the other and used with the camera housing 114 and locking ring 188. As illustrated in FIGS. 6, 10, and 11 the angled mounts 362, 462 have slightly different shapes from one another. Each of the angled mounts 362, 462, however, includes an upper region 364, 464 configured to be mounted (for example fixed) to a windshield, and a lower region 368, 468 that includes tabs 384, 484 (seen in FIG. 6) similar to the tabs 184 described above that are radially compressed by the locking ring 188 and are deflectable.

Figure 12:
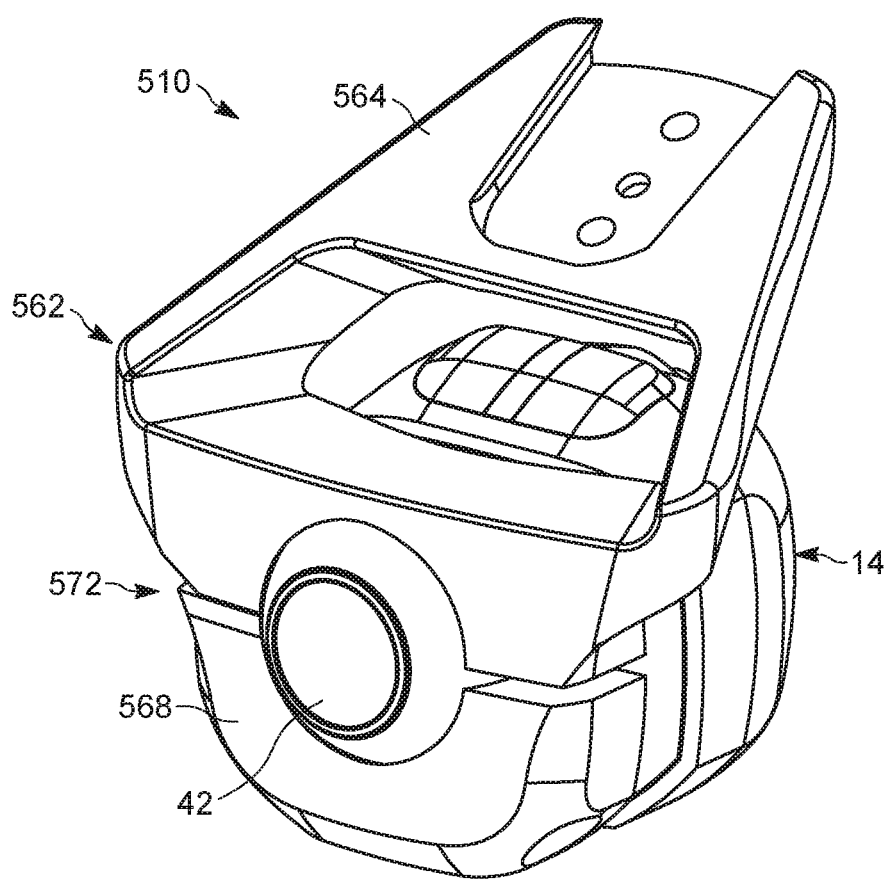
FIG. 12 is a perspective view of a camera system that includes components from the camera system of FIG. 1, as well as a clamp.

FIG. 12 illustrates a camera system 510. Similar to the camera systems 10, 110, 210, 310, and 410, the camera system 510 is designed to be used with a motor vehicle and to be mounted to an interior surface of a windshield of the motor vehicle to record activity taking place outside of the motor vehicle. In other embodiments, the camera system 510 may be mounted to structures other than a windshield (for example to a wall of a building), to record activity taking place near the camera system 510.

The camera system 510 is identical to the camera system 10, with the exception of the mount 62 being replaced by a two-piece mount 562 having an upper mount element 564 and a lower mount element 568 that together define a clamp 572. Like the set screw 90 and the locking ring 188 described above, the clamp 572 is configured to selectively engage and disengage the camera housing 14 to lock the rotational position of the camera housing 14. In some embodiments, the clamp 572 includes a screw or other fastener (or other component) that is used to tighten the upper and lower mount elements 564, 568 of the clamp 572 together to lock the rotational position of the camera housing 514. Like the set screw 90 and the locking ring 188, the clamp 572 is also a mechanism that may be used to maintain the camera lens 42 at a substantially constant or constant distance to a visual target such as a windshield, to maintain a desired focus or focal distance to the windshield or other target.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A camera system comprising:
a camera housing having a ball-shaped structure;
a camera lens disposed within the ball-shaped structure;
a mount including a receptacle to hold the camera housing, wherein the receptacle includes an aperture, wherein the ball-shaped structure is configured to extend at least partially through the aperture and is configured to rotate within the aperture;
at least one element configured to selectively engage and disengage the camera housing to fix a rotational position of the camera housing relative to the mount,
wherein the camera housing is configured to rotate relative to the mount about a plurality of axes via rotation of the ball-shaped structure within the aperture, and wherein the camera lens is configured to remain at a substantially constant distance to a visual target after the camera housing has been rotated about the plurality of axes.

2. The camera system of claim 1, wherein the camera housing includes a first housing portion and a second housing portion extending from the first housing portion, wherein the second housing portion includes the ball-shaped structure.

3. The camera system of claim 2, wherein the ball-shaped structure is a partial spherical structure and has a different size and shape than the first housing portion, wherein the ball-shaped structure and the first housing portion are integrally formed together as a single, rigid piece.

4. The camera system of claim 2, wherein the first housing portion is elongated and extends along a longitudinal axis, and wherein the camera lens is positioned axially along the longitudinal axis at a distal end of the camera housing, such that the lens faces away from the first housing portion.

5. The camera system of claim 2, wherein the first housing portion has a first diameter, and wherein the ball-shaped structure has a second diameter that is less than the first diameter.

6. The camera system of claim 1, wherein the at least one element is configured to physically engage and disengage a surface of the ball-shaped structure.

7. The camera system of claim 4, wherein the first housing portion is configured to extend away from the receptacle and the aperture along a first direction, and wherein the camera lens is configured to face away from the receptacle and the aperture in a second direction that is opposite to the first direction the aperture.

8. The camera system of claim 1, wherein the at least one element includes a screw, wherein the screw is configured to be moved relative to the mount to fix the rotational position of the camera housing.

9. The camera system of claim 1, wherein the mount includes a first region having the aperture, and a second region extending away from the first region at an oblique angle.

10. The camera system of claim 9, wherein the second region of the mount includes a cable guide along a lower surface of the second region, and wherein the camera system further includes a wiring cable extending from the camera housing and secured to the cable guide.

11. The camera system of claim 9, further comprising a windshield of a vehicle, wherein the second region of the mount is coupled to the windshield of the vehicle.

12. The camera system of claim 1, wherein the camera housing includes a first housing portion and a second housing portion extending from the first housing portion, wherein the second housing portion includes the ball-shaped structure, wherein the mount includes an anti-reflection shroud configured to extend around at least a portion of the ball-shaped structure, wherein the anti-reflection shroud is configured to extend away from the receptacle along a first direction, and wherein the first housing portion is configured to extend away from the receptacle along a second direction that is opposite to the first direction.

13. The camera system of claim 1, wherein the at least one element includes an adjustable locking ring configured to be rotated to fix the rotational position of the camera housing.

14. The camera system of claim 13, wherein the mount includes an anti-reflection shroud having deflectable tabs, wherein the locking ring is configured to be rotated to engage and radially compress the deflectable tabs against the camera housing.

15. The camera system of claim 1, wherein the at least one element includes a clamp configured to selectively engage and disengage the ball-shaped structure to fix the rotational position of the camera housing.

16. A camera system comprising:
a camera housing having an elongated first housing portion that extends along a longitudinal axis, and a second housing portion rigidly extending from the first housing portion along the longitudinal axis, wherein the second housing portion has a ball-shaped structure;
a camera lens disposed within the second housing portion, wherein the camera lens is positioned axially along the longitudinal axis at a distal end of the camera housing, such that the camera lens faces away from the first housing portion; and
a mechanism for maintaining the camera lens at a substantially constant distance to a visual target, wherein the mechanism includes a mount having a receptacle, wherein the ball-shaped structure is at least partially disposed within the receptacle.

17. The camera system of claim 16, wherein the ball-shaped structure is a partial spherical structure.

18. The camera system of claim 16, wherein the first housing portion has a first diameter and the second housing portion has a second diameter less than the first diameter.

19. The camera system of claim 16, wherein the ball-shaped structure has a different size and shape than the first housing portion, and wherein the ball-shaped structure and the first housing portion are integrally formed together as a single, rigid piece.

20. A camera system comprising:
a camera housing having a ball-shaped structure;
a camera lens disposed within the ball-shaped structure;
a mount including a receptacle to hold the camera housing, wherein the receptacle includes an aperture, wherein the ball-shaped structure is configured to extend at least partially through the aperture and is configured to rotate within the aperture about a plurality of axes;
at least one element configured to selectively engage and disengage the ball-shaped structure to fix a rotational position of the camera housing relative to the mount, wherein the camera housing is configured to freely rotate relative to the mount about a plurality of axes via rotation of the ball-shaped structure within the aperture when the at least one element is disengaged with the ball-shaped structure.

21. The camera system of claim 20, wherein the camera housing includes a first, elongate housing portion and a second housing portion extending from the first housing portion, wherein the second housing portion includes the ball-shaped structure, wherein the first housing portion is configured to extend away from the receptacle and the aperture along a first direction, and wherein the camera lens is configured to face away from the receptacle and the aperture along a second direction that is opposite to the first direction.

22. The camera system of claim 20, wherein the at least one element is selected from the group consisting of a screw configured to be moved relative to the mount to fix the rotational position of the camera housing, an adjustable locking ring configured to be rotated to fix the rotational position of the camera housing, and a clamp configured to fix the rotational position of the camera housing.

23. The camera housing of claim 20, wherein the at least one element is configured to physically engage and disengage a surface of the ball-shaped structure.

24. A camera system comprising:
a camera housing having an elongated first housing portion that extends along a longitudinal axis, and a second housing portion rigidly extending from the first housing portion along the longitudinal axis, wherein the second housing portion has a ball-shaped structure; and
a camera lens disposed within the second housing portion, wherein the camera lens is positioned axially along the longitudinal axis at a distal end of the camera housing, such that the camera lens faces away from the first housing portion;
wherein the ball-shaped structure has a different size and shape than the first housing portion, and wherein the ball-shaped structure and the first housing portion are integrally formed together as a single, rigid piece.

* * * * *